United States Patent Office 3,816,484
Patented June 11, 1974

3,816,484
ALIPHATIC HYDROCARBON 2,4-DIENAMIDES
Clive A. Henrick, Palo Alto, Calif., assignor to Zoecon Corporation, Palo Alto, Calif.
No Drawing. Continuation-in-part of application Ser. No. 187,898, Oct. 8, 1971, now Patent No. 3,752,843, which is a continuation-in-part of abandoned application Ser. No. 111,767, Feb. 1, 1971. This application Nov. 22, 1971, Ser. No. 201,162
Int. Cl. C07c 103/56; A01n 9/20
U.S. Cl. 260—404       18 Claims

ABSTRACT OF THE DISCLOSURE

Novel aliphatic hydrocarbon 2,4-diene amides, intermediates therefor, synthesis thereof, and their use for the control of insects.

---

This is a continuation-in-part of Ser. No. 187,898, filed Oct. 8, 1971 now U.S. Pat. No. 3,752,843, which is, in turn, a continuation-in-part of Ser. No. 111,767, filed Feb. 1, 1971, now abandoned, the disclosures of which are incorporated by reference.

This invention relates to novel aliphatic di-olefinic compounds, intermediates therefor, syntheses thereof and the control of insects. More particularly, the novel di-olefinic compounds of the present invention are represented by the following formula A:

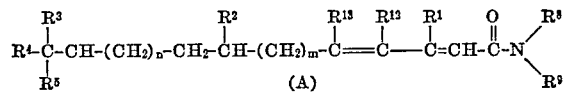

wherein, m is one; n is zero or the positive integer one;
each of $R^1$ and $R^2$ is lower alkyl;
$R^4$ is alkyl;
each of $R^3$, $R^5$, $R^{12}$, $R^{13}$ and $R^{14}$ is hydrogen or lower alkyl; and each of $R^8$ and $R^9$ is hydrogen, alkyl, or alkenyl.

The compounds of formula A are useful for the control of insects. The utility of these compounds as insect control agents is believed to be attributable to their juvenile hormone activity. They are preferably applied to the immature insect, namely-during the embryo, larvae or pupae stage in view of their effect on metamorphosis and otherwise cause abnormal development leading to death or inability to reproduce. These compounds are effective control agents for Hemipteran, such as Lygaeidae, Miridae and Pyrrhocoridae; Lepidopteran, such as Pyralidae, Noctuidae and Gelechiidae; Coleopteran, such as Tenebrionidae, Crysomelidae and Dermestidae; Dipteran, such as mosquitos, flies; Homopteran, such as aphids and other insects. The compounds can be applied at low dosage levels of the order of 0.001 μg. to 25.0 μg. per insect. Suitable carrier substances include liquid or solid carriers, such as water, acetone, xylene, mineral or vegetable oils, talc, vermiculite, natural and synthetic resins and silica. Treatment of insects in accordance with the present invention is accomplished by spraying, dusting or exposing the insects to the vapor of the compounds of formula A. Generally, a concentration of less than 25% of the active compound is employed. The formulations can include insect attractants, emulsifying agents or wetting agents to assist in the application and effectiveness of the active ingredient. In the application of the compounds, there is generally employed a mixture of the C-2,3 trans and cis isomers.

In the description hereinafter, each of Q, $R^1$–$R^5$, $R^8$, $R^9$, $R^{12}$–$R^{14}$, m and n is as defined hereinabove unless otherwise specified.

Compounds of the present invention of formula A can be prepared by reaction of an acid chloride or acid bromide of formula A' with an appropriate amine selected according to the amido moiety desired.

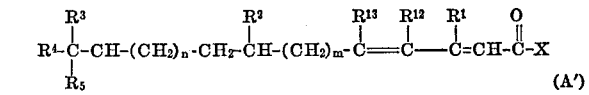

wherein X is bromo or chloro.

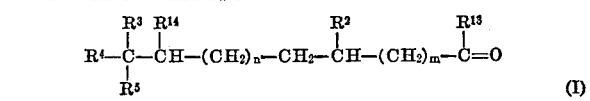

The novel amides of the present invention can be prepared also by the reaction of a carbonyl of formula I with a carbanion of the formula:

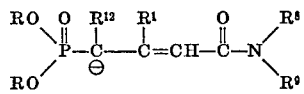

which is generated by treatment of the corresponding phosphonamide with base, such as alkali metal hydride or alkali metal alkoxide.

The amides can be prepared also by reaction of a carbonyl of formula III:

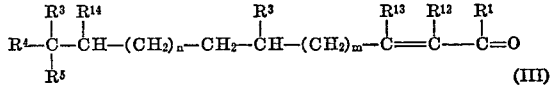

with a carbanion or ylid of the following formulas, respectively:

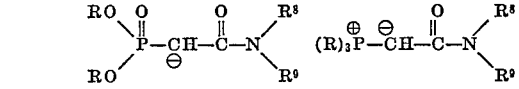

Another method for preparation of the amides of the present invention is the reaction of an alkynyl alcohol of formula IV:

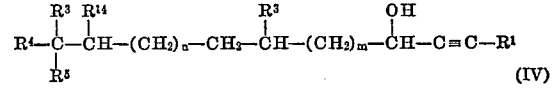

with an amide ketal to afford an allenic amide of the formula:

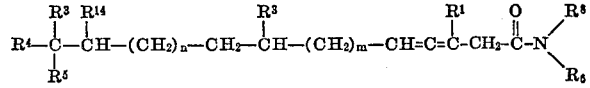

which is rearranged to the 2,4-diene under basic conditions.

Another method for the preparation of amides is base catalyzed condensation of an aldehyde, such as an aldehyde of formula I, with an amide of the formula:

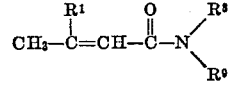

in the presence of an inorganic or organic base. Suitable bases are described in U.S. Pats. 2,662,914 and 2,951,853.

In the above formulas, R is lower alkyl, cycloalkyl or phenyl.

The precursors of formulas A', I, III and IV can be prepared according to my application Ser. No. 201,102, filed on even date herewith and now abandoned, the disclosure of which is incorporated by reference.

The term "alkenyl," as used herein, refers to an ethylenically unsaturated hydrocarbon group, branched or straight chain, having a chain length of two to three carbon atoms, e.g., allyl and vinyl. Whenever any of the foregoing terms are modified by the word "lower," the chain length of the group is not more than six carbon atoms with the exception of lower alkoxyalkyl and lower alkylthiaalkyl in which event a total chain length of twelve carbon atoms is the maximum.

The term "lower alkyl" refers to an alkyl group having a chain length of one to six carbon atoms.

The presence of an olefinic bond at position C–2 and C–4 gives rise to four isomers, each of which is embraced by the present invention. As mentioned above, a mixture of isomers is suitably employed for the control of insects, such as a mixture containing the trans(2),trans(4) isomer and the cis(2),trans(4) isomer. The conditions of the syntheses described herein and the reactants can be selected so as to favor formation of one isomer, such as the all trans isomer, over the formation of other isomers. The selection of appropriate conditions and reactants to favor formation of one isomer over another will be apparent to those of ordinary skill in the art giving due consideration to the specific examples hereinafter. See also Pattenden and Weedon, supra and Corey et al., supra. In the specific examples hereinafter, when isomerism is not specified, it is understood to include a mixture of isomers which, if desired, can be separated using known separation methods. Hereafter, when only one designation of configuration is given, the designation refers to position C–2,3 and the configuration is taken to be trans at position C–4,5 when not otherwise specified. The use of "trans/cis" and "cis/trans" is with reference to position C–2,3 and indicates a mixture of isomers.

The following examples are provided to illustrate the practice of the present invention. Temperature is given in degrees Centigrade.

EXAMPLE 1

Sodium methoxide (from 200 mg. sodium and 12 ml. methanol) is added dropwise to a stirred solution of 1.8 g. of trans diethyl 3-ethoxycarbonyl-2-methylprop-2-enyl phosphonate and 1 g. of 3,7-dimethyl-1-nonanal in 50 ml. of dimethylformamide, under nitrogen. The reaction mixture is left for one hour at room temperature and then water is added, followed by extraction with ether. The ethereal extracts are washed with brine, dried and evaporated to yield trans/cis methyl 3,7,11-trimethyltrideca-2,4-dienoate. The isomeric mixture can be chromatographed on silica or distilled for purification. The isomeric mixture is predominantly trans at C–2,3.

The foregoing procedure is repeated using ethyl 3-methoxycarbonyl-2-methylprop-2-enyl phosphonate and each of:

3-methyl-7-ethylnonan-1-al,
3,7-dimethylnonan-1-al,
3,6,7-trimethyloctan-1-al,
3,7,8-trimethylnonan-1-al,
3-methyloctan-1-al, and
3,6,7-trimethylnonan-1-al to prepare methyl 3,7-dimethyl-11-ethyltrideca-2,4-dienoate,
methyl 3-methyl-7,11-diethyltrideca-2,4-dienoate,
methyl 3,7,10,11-tetramethyldodeca-2,4-dienoate,
methyl 3,7,11,12-tetramethyltrideca-2,4-dienoate,
methyl 3,7-dimethyldodeca-2,4-dienoate and,
methyl 3,7,10,11-tetramethyltrideca-2,4-dienoate respectively.

The foregoing procedure is repeated using sodium ethoxide in place of sodium methoxide to yield trans/cis ethyl 3,7,11-trimethyltrideca-2,4-dienoate.

EXAMPLE 2

To a mixture of 250 mg. of sodium hydride in 2 ml. of tetrahydrofuran, with ice-cooling, is added 1.6 g. of trans diethyl 3-ethoxycarbonyl-2-methylprop-2-enyl phosphonate in 5 ml. of tetrahydrofuran. Temperature is allowed to rise to room temperature and after 30 minutes, 0.95 g. of 3-ethyl-7-methyl-1-nonanal is added. After about one hour at room temperature, the mixture is extracted with ether. The ethereal extracts are washed with brine, dried and evaporated to yield trans/cis ethyl 3,11-dimethyl-7-ethyl-trideca-2,4-dienoate (about 1:1 mixture of C–2,3 trans and cis isomers).

EXAMPLE 3

To 125 mg. of a 57% dispersion of sodium hydride in oil is added pentane. The pentane is removed and the sodium hydride washed several times with pentane. To the washed sodium hydride is added 582 mg. of diethyl acetylmethylphosphonate (IIA; R is ethyl, $R^1$ is methyl) in 5 ml. of tetrahydrofuran at −10° under argon. After several minutes, the solution is transferred to a solution of 425 mg. of 3,7-dimethyloctan-1-al in about 4 ml. of dry tetrahydrofuran under argon over a period of about 20 minutes at room temperature. After about two hours, water is added followed by addition of ether and the layers separated. The organic layer is washed with saturated sodium chloride, dried over sodium sulfate and evaporated under reduced pressure to yield 6,10-dimethylundec-3-en-2-one.

EXAMPLE 4

32.3 grams of sodium hydride (57% in oil) is placed in a dry, one liter, 3-neck flask (fitted with a nitrogen inlet) and washed three times (100 ml. each) with dry pentane under nitrogen, carefully decanting only the solvent each time, into a beaker of ethanol. 400 milliliters dry tetrahydrofuran is then added, the mixture cooled to 0°, and 156.0 g. of diethyl carbethoxymethyl phosphonate is added under nitrogen. The solution is stirred for 0.5 hour after addition is complete, and then 120 g. of 6,10-dimethylundec-3-en-2-one in 250 ml. dry tetrahydrofuran is added over about 0.5 hour period at room temperature under nitrogen. The mixture is stirred overnight at 60° and then poured into saturated NaCl at 0° and extracted with ether (3× 200 ml.), the organic layers dried ($CaSO_4$) and concentrated under reduced pressure to yield trans/cis ethyl 3,7,11-trimethyldodeca-2,4-dienoate which can be separated into the individual C–2,3 trans and cis isomers using gas-liquid chromatography or fractional distillation.

EXAMPLE 5

A mixture of 1 g. of trans/cis methyl 3,7,11-trimethyldodeca-2,4-dienoate, 60 ml. of methanol, 0.5 g. of sodium hydroxide and 6 ml. of water is stirred at about 30° for about 56 hours. The mixture is then diluted with water, neutralized and extracted with ether. The organic phase is washed with water, dried over sodium sulfate and evaporated to yield trans/cis 3,7,11-trimethyldodeca-2,4-dienoic acid.

EXAMPLE 6

To 1.6 g. of sodium hydride (57% in oil dispersion) in a 500 ml., 3-neck flask, fitted with a nitrogen inlet, is added 25 to 50 ml. of dry hexane or pentane and the mixture swirled under nitrogen. The NaH is allowed to settle and the solvent carefully decanted into a beaker containing ethanol. This rinsing process is repeated twice and 100 ml. of dry tetrahydrofuran is added via syringe or pipet. Mixture is cooled in an ice-bath and 9.0 g. of triethylphosphonoacetate (dried over molecular sieves) is added via addition funnel over a 10 minute period. Stir an additional one-half hour. The solution of the above anion is transferred via syringe to a 125 ml. addition funnel (with pressure equalizing arm) and is added over about one hour to 6.73 g. of 6,10-dimethyldodec-3-en-2-one at room temperature with stirring. The homogenous solution is then refluxed overnight (18–24 hours). The mixture is then poured into saturated sodium chloride at 0° and extracted with ether. The organic phase is dried and concentrated under reduced pressure to yield trans/cis ethyl 3,7,11-trimethyltrideca-2,4-dienoate, which can be purified by chromatography or distillation.

EXAMPLE 7

41 grams of 3,7-dimethyloctan-1-al and 80 g. of recrystallized (ethyl acetate) triphenylphosphineacetylmethylene [Ramirez et al., *J. Org. Chem.* 22, 41 (1957)] are refluxed in one liter of dry toluene for 18 hours, under nitrogen. Most of the solvent is removed *in vacuo*, 500 ml. pentane is added and the mixture filtered. The flask and the triphenylphosphine oxide filter cake are washed several times with pentane. The filtrate is concentrated *in vacuo* to yield 6,10-dimethylundec-3-en-2-one.

By use of the foregoing Wittig reaction, other aldehydes of formula I are converted into the corresponding mono unsaturated ketones of formula III.

EXAMPLE 8

One gram of triphenylphosphineacetylmethylene and 425 mg. of 3,7-dimethylnonan-1-al are dissolved in 10 ml. of toluene and refluxed under nitrogen overnight. The toluene is distilled off and the formed triphenylphosphine oxide crystallized by addition of pentane. Filtration and evaporation of the pentane gives a residue, which is further purified by preparative, thin-layer chromatography, with the plate eluted with 15% ethyl acetate:hexane. Removal of the UV active band gives 6,10-dimethyldodec-3-en-2-one.

EXAMPLE 9

To a mixture of one g. of 3,7-dimethyl-1-octanal and 1.5 g. of diethyl carbethoxymethylphosphonate and 50 ml. of dimethylformamide, under nitrogen, is slowly added sodium ethoxide (prepared from 200 mg. of sodium and 12 ml. of ethanol). The mixture is allowed to stand at room temperature for one hour and then is worked up with ether. The ethereal extracts are dried, concentrated and then chromatographed on silica plates eluting with hexane:ether (5% ether) to yield 3,7,11-trimethyl-dodeca-2,4-dienoate, which is predominantly trans at position C-2,3.

EXAMPLE 10

Following the procedure of Example 2 or 9, each of the aldehydes under column I is reacted with the carbanion of diethyl 3-ethoxycarbonyl-2-methylprop-2-enyl phosphonate to produce the corresponding ethyl esters under column II.

I 3,7-dimethyloctan-1-al,
3,7-dimethylnonan-1-al,
3-ethyl-7-methylnonan-1-al,
3,6-dimethylheptan-1-al,
3,9-dimethyldecan-1-al.

II ethyl 3,7,11-trimethyldodeca-2,4-dienoate,
ethyl 3,7,11-trimethyltrideca-2,4-dienoate,
ethyl 3,11-dimethyl-7-ethyltrideca-2,4-dienoate,
ethyl 3,7,10-trimethylundeca-2,4-dienoate,
ethyl 3,7,13-trimethyltetradeca-2,4-dienoate.

EXAMPLE 11

Each of the esters under column II is hydrolyzed using the procedure of Example 5 or by refluxing for about 20 hours to produce the corresponding free acid under column III.

III 3,7,11-trimethyldodeca-2,4-dienoic acid,
3,7,11-trimethyltrideca-2,4-dienoic acid,
3,11-dimethyl-7-ethyltrideca-2,4-dienoic acid,
3,7,10-trimethylundeca-2,4-dienoic acid,
3,7,13-trimethyltetradeca-2,4-dienoic acid.

EXAMPLE 12

Each of the aldehydes under column I is used as the aldehyde starting material in the procedure of Example 3, 7 or 8 to produce the corresponding ketone under column IV.

IV 6,10-dimethylundec-3-en-2-one,
6,10-dimethyldodec-3-en-2-one,
6-ethyl-10-methyldodec-3-en-2-one,
6,9-dimethyldec-3-en-2-one,

EXAMPLE 13

Each of the ketones under column IV is converted into the corresponding methyl ester under column V using the procedure of Example 4 or 6.

V methyl 3,7,11-trimethyldodeca-2,4-dienoate,
methyl 3,7,11-trimethyltrideca-2,4-dienoate,
methyl 3,11-dimethyl-7-ethyltrideca-2,4-dienoate,
methyl 3,7,10-trimethylundeca-2,4-dienoate,
methyl 3,7,13-trimethyltetradeca-2,4-dienoate.

Each of the methyl esters under column V is hydrolyzed to the free acid using the procedure of Example 5 or by refluxing for several hours.

EXAMPLE 14

One gram of 3,7,11-trimethyltrideca-2,4-dienoic acid in 30 ml. of benzene and one mole of sodium hydride is stirred for about two hours and then a slight excess of oxalyl chloride is added at about 0° and stirred for one hour. The product is worked up by removal of solvent in vacuo and extraction with pentane to yield 3,7,11-trimethyltrideca-2,4-dienoyl chloride.

Using the foregoing process, there is prepared:

3,7,11-trimethyldodeca-2,4-dienoyl chloride,
3,11-dimethyl-7-ethyltrideca-2,4-dienoyl chloride,
3,7,13-trimethyltetradeca-2,4-dienoyl chloride.

EXAMPLE 15

Following the procedure of either Example 1, 2 or 9, each of the aldehydes under Column VII is converted into the respective ester under column VIII.

VII 3,7,7-trimethyloctan-1-al,
3,7,7-trimethylnonan-1-al,
3,6,6-trimethylheptan-1-al, and
3,8,8-trimethylnonan-1-al.

VIII ethyl 3,7,11,11-tetramethyldodeca-2,4-dienoate,
ethyl 3,7,11,11-tetramethyltrideca-2,4-dienoate,
ethyl 3,7,10,10-tetramethylundeca-2,4-dienoate, and
ethyl 3,7,12,12-tetramethyltrideca-2,4-dienoate.

EXAMPLE 16

The aldehydes under column VII are used as the starting material in the process of Example 3, 7 or 8 to prepare the respective ketone under column IX.

IX 6,10,10-trimethylundec-3-en-2-one,
6,10,10-trimethyldodec-3-en-2-one,
6,9,9-trimethyldec-3-en-2-one, and
6,11,11-trimethyldodec-3-en-2-one.

EXAMPLE 17

(A) To magnesium propynlide (15 g.) in 150 ml. of ether is slowly added 0.3 mole of 3,7-dimethyl-1-octanal at 0° and the mixture then stirred overnight. Saturated aqueous ammonium chloride is added and the layers separated. The organic phase, combined with either backwashings of aqueous phase, is washed with water, dried and solvent evaporated to yield 6,10-dimethylundec-2-yn-4-ol which can be purified by distillation or chromatography.

(B) A mixture of 18.5 g. of 6,10-dimethylundec-2-yn-4-ol, 80 g. of triethylorthoacetate and 0.75 g. of propionic acid is refluxed under a spinning band column to remove ethanol as it is formed. After the elimination of ethanol is about complete, the crude reaction product is distilled under vacuum to yield ethyl 3,7,11-trimethyldodeca-3,4-dienoate. Alternatively, the crude reaction product is purified by chromatography on silica.

(C) A solution of 1.0 g. of allenic ester of part B in 20 ml. of ethanol is treated with 4 ml. of aqueous 2 N sodium hydroxide and left at room temperature for several minutes. The mixture is then poured into pentane and washed with saturated brine and separated. Evaporation of the organic phase yields ethyl 3,7,11-trimethyldodeca-2,4-dienoate.

By using N,N-dimethylacetamide dimethylacetal in part B above in place of triethylorthoacetate, there is prepared N,N-dimethyl 3,7,11-trimethyldodeca - 3,4 - dienamide which is rearranged according to part (C) above to prepare N,N-dimethyl 3,7,11-trimethyldodeca-2,4-dienamide. The alleneamide is prepared under reflux in toluene in the absence of propionic acid.

EXAMPLE 18

The process of part (A) of Example 17 is repeated using each of the aldehydes under column XI to produce the respective alkynyl alcohol under column XII.

XI 3,7-dimethylnonan-1-al,
3,7,7-trimethyloctan-1-al,
3,7,7-trimethylnonan-1-al,
3,6-dimethylheptan-1-al.

XII 6,10-dimethyldodec-2-yn-4-ol,
6,10,10-trimethylundec-2-yn-4-ol,
6,10,10-trimethyldodec-2-yn-4-ol,
6,9-dimethyldec-2-yn-4-ol.

The alkynyl alcohols under column XII are reacted with triethylorthoacetate to produce the respective allenic ester under column XIII which are rearranged to produce the esters under column XIV.

XIII ethyl 3,7,11-trimethyltrideca-3,4-dienoate,
ethyl 3,7,11,11-tetramethyldodeca-3,4-dienoate,
ethyl 3,7,11,11-tetramethyltrideca-3,4-dienoate,
ethyl 3,7,10-trimethylundeca-3,4-dienoate.

XIV ethyl 3,7,11-trimethyltrideca-2,4-dienoate,
ethyl 3,7,11,11-tetramethyldodeca-2,4-dienoate,
ethyl 3,7,11,11-tetramethyltrideca-2,4-dienoate,
ethyl 3,7,10-trimethylundeca-2,4-dienoate.

EXAMPLE 19

Each of the alkynyl alcohols of Examples 17 and 18 is reacted with trimethylorthoacetate to produce the respective allenic ester under column XVI, which is rearranged to produce the respective 2,4-dienoate under column XVII.

XVI methyl 3,7,11-trimethyldodeca-3,4-dienoate,
methyl 3,7,11-trimethyltrideca-3,4-dienoate,
methyl 3,7,11,11-tetramethyldodeca-3,4-dienoate,
methyl 3,7,11,11-tetramethyltrideca-3,4-dienoate,
methyl 3,7,10-trimethylundeca-3,4-dienoate.

XVII methyl 3,7,11-trimethyldodeca-2,4-dienoate,
methyl 3,7,11-trimethyltrideca-2,4-dienoate,
methyl 3,7,11,11-tetramethyldodeca-2,4-dienoate,
methyl 3,7,11,11-tetramethyltrideca-2,,4-dienoate,
methyl 3,7,10-trimethylundeca-2,4-dienoate.

EXAMPLE 20

Sodium ethoxide (9 g. sodium in 600 ml. of ethanol) is added slowly to a mixture of 42 g. of dihydrocitronellal and 75 g. of diethyl 3-ethoxycarbonyl-2-methylprop-2-enyl phosphonate (about 49% trans) in one liter of dimethylformamide, under nitrogen and at 0°, with stirring. The mixture is allowed to stand overnight at about 5° and the reaction worked up by extraction with ether, washing with water and brine and filtering through Florisil to yield ethyl 3,7,11-trimethyldodeca-2,,4-dienoate as a cis/trans mixture, mostly trans,trans.

EXAMPLE 21

Sodium methoxide (1.2 g. of sodium and 30 ml. of methanol) is added slowly to a mixture of 5 g. of dihydrocitronellal and 10 g. of diethyl 3-methoxycarbonyl-2-methylprop-2-enyl phosphonate (about 77% trans) in 50 ml. of dimethylformamide, under nitrogen and at about 0°, with stirring. After addition is complete, the reaction is left three hours at room temperature and then worked up by extraction with hexane/ether to yield cis/trans methyl 3,7,11-trimethyldodeca-2,4-dienoate, mostly the trans,trans isomer.

EXAMPLE 22

To a mixture of 1.5 g. of dihydrocitronellal, 2.7 g. of diethyl 3-ethoxycarbonyl - 2 - methylprop-2-enyl phosphonate and 5 ml. of dimethylformamide, under nitrogen and at 0°, with stirring, is added slowly sodium methoxide (250 mg. sodium and 5 ml. of methanol). After addition is complete, the reaction is left two hours at room temperature and then worked up by extraction with ether/hexane to yield methyl 3,7,11-trimethyldodeca-2,4-dienoate.

EXAMPLE 23

To a mixture of 30 g. of dihydrocitronellal, 44 g. of diethyl 3-ethoxycarbonyl-2-ethylprop-2-enyl phosphonate and 200 ml. of dimethylformamide, under nitrogen at 0° and with stirring, is added slowly sodium ethoxide (4.6 g. sodium in 100 ml. of ethanol). After addition is complete, the reaction is left at room temperature for two hours and then worked up by extraction with hexane to yield ethyl 3-ethyl-7,11-dimethyldodeca-2,4-dienoate.

EXAMPLE 24

To 0.6 g. of recrystallized trans,trans 3,7,11-trimethyldodeca-2,4-dienoic acid in 10 ml. of dry benzene is added 0.23 ml. of oxalyl chloride at room temperature with stirring. After two hours, isopropanol (2 ml.) is added and the mixture allowed to stand at room temperature for about two hours. Ether and saturated sodium bicarbonate is added and the organic phase separated. The organic phase is washed with aqueous sodium bicarbonate, saturated sodium chloride, dried over calcium sulfate and evaporated to yield trans,trans isopropyl 3,7,11-trimethyldodeca-2,4-dienoate containing a small amount of cis, trans isomer.

EXAMPLE 25

To 350 ml. of ethanol, 105 ml. of water and 70 ml. of 50% aqueous sodium hydroxide is added 46.5 g. of ethyl 3,7,11-trimethyldodeca-2,4-dienoate (40% cis,trans and 60% trans,trans). The mixture is refluxed for 19 hours. After cooling, ethanol is removed under reduced pressure and water added followed by extraction with ether to yield 3,7,11-trimethyldodeca-2,4-dienoic acid containing about 58% trans,trans isomer. Conversion of the thus-obtained acid to the S-benzyl-isothiouranium salt recrystallized from aqueous methanol and regeneration of the acid with ether-aqueous hydrochloric acid provides crystalline trans,trans 3,7,1-trimethyldodeca-2,4-dienoic acid.

EXAMPLE 26

By use of the procedures hereinabove, see Examples 20 and 21, for example, each of the aldehydes under column XVIII is reacted with the carbanion of diethyl 3-ethoxycarbonyl-2 - methylprop - 2-enyl phosphonate to prepare the respective ethyl ester under column XIX.

XVIII 3,7-dimethyldecan-1-al,
3,7-dimethylundecan-1-al,
3,5,6-trimethylheptan-1-al, and
3,8-dimethylnonan-1-al.

XIX ethyl 3,7,11-trimethyltetradeca-2,4-dienoate,
ethyl 3,7,11-trimethylpentadeca-2,4-dienoate,
ethyl 3,7,9,10-tetramethylundeca-2,4-dienoate, and
ethyl 3,7,12-trimethyltrideca-2,4-dienoate.

EXAMPLE 27

(A) Eighty ml. of a 3 M solution of methylmagnesium bromide in ether is added slowly to 31 g. of dihydrocitronellal in 250 ml. of dry ether. The mixture is heated at reflux for about one hour, cooled to 0° and treated with saturated aqueous ammonium chloride until reaction subsides. The organic layer is separated and the aqueous layer extracted with ether. The organic layer and ether extracts are combined, washed with water and brine and dried over magnesium sulfate. Evaporation of the solvent gives 4,8-dimethylnonan-2-ol.

(B) A solution of 47 g. of 4,8-dimethylnonan-2-ol in 250 ml. of methylene chloride is cooled to about 10° as a solution of 46.4 g. of sodium dichromate in 125 ml. of water is added. The mixture is maintained at about 10° as a solution of 46.3 g. of sulfuric acid in 100 ml. of water is added over about 45 minutes. The mixture is allowed to attain room temperature and, after about 3 hours, the organic layer is separated and the aqueous layer is extracted with methylene chloride. The combined organic materials are washed with saturated potassium bicarbonate, water and saturated sodium chloride, dried over magnesium sulfate and evaporated to yield 4,8-dimethylnonan-2-one.

The Grignard reaction of part (A) is repeated using each of 3,7-dimethylnonan-1-al, 3-methyl-7-ethylnonan-1-al, 3,7,7-trimethyloctan-1-al, 3,7,7-trimethylnonane-1-al, 3,6,7-trimethyloctan-1-al, 3,7,8-trimethylnonan-1-al, 2,4,5-trimethylhexan-1-al, 2,5-dimethylhexan - 1 - al, 3,5,6-trimethylheptan-1-al 3,6-dimethylheptan-1-al, 2,6-dimethylheptan-1-al and 2,5,6-trimethylheptan-1-al in place of dihydrocitronellal to yield the respective secondary alcohol:

4,8-dimethyldecan-2-ol,
4-methyl-8-ethyldecan-2-ol,
4,8,8-trimethylnonan-2-ol,
4,8,8-trimethyldecan-2-ol,
4,7,8-trimethylnonan-2-ol,
4,8,9-trimethyldecan-2-ol,
4,6,7-trimethyloctan-2-ol, and
4,7-dimethyloctan-2-ol.

Each of the above alcohols is oxidized to prepare the respective ketone:

4,8-dimethyldecan-2-one,
4-methyl-8-ethyldecan-2-one,
4,8,8-trimethylnonan-2-one,
4,8,8-trimethyldecan-2-one,
4,7,8-trimethylnonan-2-one,
4,8,9-trimethyldecan-2-one,
4,6,7-trimethyloctan-2-one, and
4,7-dimethyloctan-2-one.

Each of the above alcohols is oxidized to prepare the respective ketone:

4,8-dimethyldecan-2-one,
4-methyl-8-ethyldecan-2-one,
4,8,8-trimethylnonan-2-one,
4,8,8-trimethyldecan-2-one,
4,7,8-trimethylnonan-2-one,
4,8,9-trimethyldecan-2-one,
4,6,7-trimethyloctan-2-one, and
4,7-dimethyloctan-2-one.

(C) Each of the ketones of part (B) is reacted with the carbanion of diethyl 3-ethoxycarbonyl-2-methylprop-2-enyl phosphonate according to procedures described above to prepare the respective 2,4-dienoate i.e.:

ethyl 3,5,7,11-tetramethyldodeca2,4-dienoate,
ethyl 3,5,7,11-tetramethyltrideca-2,4-dienoate,
ethyl 3,5,7-trimethyl-11-ethyltrideca-2,4-dienoate,
ethyl 3,5,7,11,11-pentamethyldodeca-2,4-dienoate,
ethyl 3,5,7,11,11-pentamethyltrideca-2,4-dienoate,
ethyl 3,5,7,10,11-pentamethyldodeca-2,4-dienoate,
ethyl 3,5,7,11,12-pentamethyltrideca-2,4-dienoate,
ethyl 3,5,7,9,10-pentamethylundeca-2,4-dienoate,
ethyl 3,5,7,10-tetramethylundeca-2,4-dienoate.

EXAMPLE 28

(A) Each of the ketones of part (B) of Example 27 is reacted with the carbanion of diethyl 3-ethoxycarbonyl-1,2-dimethyl-prop-2-enylphosphonate to prepare the respective 2,4-dienoate, i.e.:

ethyl 3,4,5,7,11-pentamethyldodeca-2,4-dienoate,
ethyl 3,4,5,7,11-pentamethyltrideca-2,4-dienoate,
ethyl 3,4,5,7-tetramethyl-11-ethyltrideca-2,4-dienoate,
ethyl 3,4,5,7,11,11-hexamethyldodeca-2,4-dienoate,
ethyl 3,4,5,7,11,11-hexamethyltrideca-2,4-dienoate,
ethyl 3,4,5,7,10,11-hexamethyldodeca-2,4-dienoate,
ethyl 3,4,5,7,11,12-hexamethyltrideca-2,4-dienoate,
ethyl 3,4,5,7,9,10-hexamethylundeca-2,4-dienoate, and
ethyl 3,4,5,7,10-pentamethylundeca-2,4-dienoate.

(B) Each of the aldehydes under col. I is reacted with the carbanion of diethyl 3-ethoxycarbonyl-1,2-dimethyl-prop-2-enyl phosphonate to prepare the respective 2,4-dienoate, i.e.:

ethyl 3,4,7,11-tetramethyldodeca-2,4-dienoate,
ethyl 3,4,7,11-tetramethyltrideca-2,4-dienoate,
ethyl 3,4,11-trimethyl-7-ethyltrideca-2,4-dienoate,
ethyl 3,4,7,10-tetramethylundeca-2,4-dienoate,
ethyl 3,4,7,13-tetramethyltetradeca-2,4-dienoate,
3,7,9,10-tetramethylundeca-2,4-dienoyl chloride,
3,7,10-trimethylundeca-2,4-dienoyl chloride,
3,7,10,10-tetramethylundeca-2,4-dienoyl chloride,
3,7,12-trimethyltrideca-2,4-dienoyl chloride, and
3,8,11-trimethyltrideca-2,4-dienoyl chloride.

By use of the procedure of part (B) of this example, other aldehydes of formula I ($R^{13}$ is hydrogen) are converted into the respective ester, wherein $R^{13}$ is hydrogen and $R^{12}$ is methyl or other lower alkyl. Similarly, following the procedure of part (A) of this example, other ketones of formula I ($R^{13}$ is lower alkyl) are converted into esters wherein each of $R^{12}$ and $R^{13}$ is lower alkyl. Using the process of part (C) of Example 27, other esters, wherein $R^{12}$ is hydrogen and $R^{13}$ is methyl or other lower alkyl, can be prepared using a ketone of formula I ($R^{13}$ is lower alkyl) as the precursor.

(C) Each of the esters of this example and Example 27 can be hydrolyzed to the free acid according to the procedure of Example 5 or 25.

EXAMPLE 29

Following the process of Example 24, there is prepared the following acid chlorides by the reaction of oxalyl chloride with the free acid.

3,7,11-trimethyltrideca-2,4-dienoyl chloride,
3,11-dimethyl-7-ethyltrideca-2,4-dienoyl chloride,
3,7-dimethyl-11-ethyltrideca-2,4-dienoyl chloride,
3,7,11,11-tetramethyldodeca-2,4-dienoyl chloride,
3,7,11,11-tetramethyltrideca-2,4-dienoyl chloride,
3,7,10,11-tetramethyldodeca-2,4-dienoyl chloride,
3,7,10,11-tetramethyltrideca-2,4-dienoyl chloride,
3,7,11,12-tetramethyltrideca-2,4-dienoyl chloride, and
3,7,11-trimethyltetradeca-2,4-dienoyl chloride.

EXAMPLE 30

Two grams of 3,7,11-trimethyltrideca-2,4-dienoic acid chloride is added to 50 ml. of benzene, cooled to 0° and saturated with ammonia under nitrogen. The mixture is allowed to stand for about one hour and then it is washed with water, dried over sodium sulfate and evaporated to yield 3,7,11-trimethyltrideca-2,4-dienamide.

EXAMPLE 31

Three grams of 3,7,11-trimethyltrideca-2,4-dienoyl chloride in benzene is mixed with 2.5 g. of diethylamine in benzene and the resulting mixture allowed to stand at room temperature for about two hours. The mixture is concentrated under reduced pressure and the residue taken up in benzene, washed with dilute aqueous sodium bicarbonate and water, dried over sodium sulfate and evaporated to yield N,N-diethyl 3,7,11-trimethyltrideca-3,4-dienamide.

By use of the foregoing procedure, each of dimethylamine, ethylamine, methylamine, isopropylamine and, methylethylamine, is reacted with the acid chloride to yield the corresponding amide, that is, N,N-dimethyl 3,7,11-trimethyltrideca-2,4-dienamide,
N-ethyl 3,7,11-trimethyltrideca-2,4-dienamide,
N-methyl 3,7,11-trimethyltrideca-2,4-dienamide,
N-isopropyl 3,7,11-trimethyltrideca-2,4-dienamide, and
N-methyl-N-ethyl 3,7,11-trimethyltrideca-2,4-dienamide.

EXAMPLE 32

Sodium hydride (1.7 g., 57% in oil) is washed three times with dry hexane. The hexane is removed and 15 ml. of dry tetrahydrofuran is added. N,N-diethyl diethoxyphosphonoacetamide (0.9 g.) dissolved in 5 ml. of dry tetrahydrofuran, cooled, is added and stirred for 40 minutes at 0°. Then about 0.7 g. of 6,10-dimethyldodeca-3-en-2-one in 5 ml. of dry tetrahydrofuran is added with stirring and cooling with an ice-bath. The ice-bath is removed after addition is completed and stirring continued for about two hours. Then the mixture is poured into water and extracted with ether. The ether extracts are combined, washed with water, dried over magnesium sulfate and evaporated under reduced pressure to yield cis/trans N,N-diethyl 3,7,11-trimethyltrideca-2,4-dienamide.

The foregoing procedure is repeated using the other ketones of column IV as the starting material to yield N,N-diethyl 3,7,11-trimethyldodeca-2,4-dienamide
N,N-diethyl 3,11-dimethyl-7-ethyltrideca-2,4-dienamide,
N,N-diethyl 3,7,10-trimethylundeca-2,4-dienamide, and
N,N-diethyl 3,7,13-trimethyltetradeca-2,4-dienamide.

By using other phosphonoamides in the process of this example, such as N,N-dimethyl diethoxyphosphonoacetamide, the corresponding amides are obtained, such as N,N-dimethyl 3,7,11-trimethyltrideca-2,4-dienamide.

The ketones under column IX are reacted with the carbanion of N,N-diethyl diethoxyphosphonoacetamide to produce the respective amide:

N,N-diethyl 3,7,11,11-tetramethyldodeca-2,4-dienamide,
N,N-diethyl 3,7,11,11-tetramethyltrideca-2,4-dienamide,
N,N-diethyl 3,7,10,10-tetramethylundeca-2,4-dienamide, and
N,N-diethyl 3,7,12,12-tetramethyltrideca-2,4-dienamide.

EXAMPLE 33

Each of ethylamine, dimethylamine, isopropylamine, methylisopropylamine, ethyl-m-propylamine, allylamine, methallylamine, and ethenylamine is reacted with 3,7,11-trimethyldodeca-,2,4-dienoyl chloride to prepare the respective amide, that is:

N-ethyl 3,7,11-trimethyldodeca-2,4-dienamide,
N,N-dimethyl 3,7,11-trimethyldodeca-2,4-dienamide,
N-isopropyl 3,7,11-trimethyldodeca-2,4-dienamide,
N-methyl N-isopropyl 3,7,11-trimethyldodeca-2,4-dienamide,
N-ethyl N-propyl 3,7,11-trimethyldodeca-2,4-dienamide,
N-allyl 3,7,11-trimethyldodeca-2,4-dienamide,
N-methylallyl 3,7,11-trimethyldodeca-2,4-dienamide, and
N-ethenyl 3,7,11-trimethyldodeca-2,4-dienamide.

Three groups of 20 each of *Tenebrio molitor* pupae (less than 24 hours old) maintained on wheat germ and bran, 25° room, 18 hours light, are treated at 0.01, 0.1 and 1.0 μg. with N,N-diethyl 3,7,11-trimethyldodeca-2,4-dienamide (predominantly all trans) using acetone carrier. The active ingredient is placed on the 5th abdominal sterinite using a syringe. The $ID_{50}$ was less than 0.01 μg.

A fine dust is prepared of 10 parts of N,N-diethyl 3,7,11-trimethyldodeca-2,4-dienamide and 90 parts synthetic fine silica, by weight, by blending in a Waring Blendor. The fine dust is particularly useful for the control of aphids.

Although not intending to be limited by a theoretical explanation, the effectiveness of the compounds of the present invention to control insects is attributed to the property of these novel compounds to mimic the activity of juvenile hormone as demonstrated herein. While the methods of applying and carriers for conventional insecticides are usually adaptable to the practical use of the compounds of the present invention, the mechanism of action of these novel compounds is unlike that of conventional insecticides. Whereas conventional insecticides are dependent upon direct knock-down effect, toxicity effect or paralyzing effect, the compounds of this invention achieve control by reason of their ability to inhibit metamorphosis, inhibit reproduction due to abnormal development, break diapause at an unfavorable time, or act as a direct insecticide, particularly at the embryo stage and larvae stage. Treatment of the insects in accordance with the present invention can be achieved via ingestion of the active compound in the normal food of the insect and by topical application, that is, by contact of the epidermis of the insect as by spraying the insect and habitat of the insect or exposure to vapors of the active compound which penetrate into the insect.

The compounds of the present invention can be used in conjunction with other juvenile hormone active substances and conventional insecticides to obtain a broader spectrum of activity or to provide more immediate effect on very heterogeneous populations. Typical insecticides which may be combined with the compounds of the present invention are Malathion, Sevin, Vapona, synthetic and natural pyrethrins, and the like, and usually within the ratio of between 10:1 to 1:10, by weight.

The following is an example of a granule formulation in accordance with the present invention:

| | Percent |
|---|---|
| Attaclay 15–30 | 80 |
| Propylene glycol | 1 |
| Compound A | 19 |

Attaclay 15–30 is an attapulgus clay product of Minerals & Chemicals Philipp Corporation. Compound A is N,N-diethyl 3,7,11-trimethyldodeca-2,4-dienamide.

The following is an example of a water-dispersable powder formulation in accordance with the present invention:

| | Percent |
|---|---|
| Hi Sil 233 | 73.5 |
| Igepon-T-77 | 1.0 |
| Defoamer | 0.5 |
| Compound A | 25.0 |

Hi Sil is a trademark of PPG Industries. Igepon-T-77 is an anionic wetting agent of GAF Corporation. Defoamer is soap flakes but other defoamers can be used.

The following is an example of an emulsive formulation in accordance with the present invention:

| | Percent |
|---|---|
| Solvent | 14 |
| Atlox 3403F | 1 |
| Atlox 3404F | 3 |
| Compound A | 82 |

Solvent is xylene although other solvents can be used. Atlox is trademark of Atlas Chemical Industries, Inc. The emulsive is diluted in water and applied. A deactivator, such as a tertiary amine, can be added to above formulation, usually in the amount of about 1% depending on shelf life desired.

An example of a concentrate which can be applied without dilution using ultra-low volume sprayer is the following:

| | Percent |
|---|---|
| Solvent | 10–20 |
| Compound A | 80–90 |

Solvent can be xylene, heavy aromatic naphtha, and the like.

In the foregoing formulations, in place of compound A, there can be used other compounds of the present invention of formula A described herein and combinations thereof.

Three groups of 30 each of *Aedes aegypti*, fourth instar larvae, in 50 ml. of tap water containing a few drops of liver powder suspension, room temperature of 28° and photoperiod of 18 hours, are treated with N-ethyl 3,7,11-trimethyldodeca-2,4-dienamide (about 83.5%, trans, trans) using 50 microliters of acetone as the carrier at three different dosage levels. A fourth group is maintained under identical conditions. Each group is scored after seven days by the following system: 0=normal adult, completely emerged (free or floating); 1=adnormal adult, non-viable; 2=incompletely emerged adult, 3=dead pupa; and 4=dead larvae. For each group the total number of animals in classes 1–4 is divided by 30 to determine the percentage result. The $ID_{50}$ is computed by plotting on semi-logarithmic paper, the dose on the horizontal axis and the percentage response on the vertical axis. The $ID_{50}$ was determined to be less than 0.1 p.p.m. Each of the larvae of the control group developed into normal adults.

EXAMPLE 35

To a solution of 6.2 g. of 3,7,11-trimethyldodeca-2,4-dienoic acid and 125 ml. of dry benzene, under nitrogen, is added 6.7 ml. of oxalyl chloride. After two hours, solvent is removed under reduced pressure. Then, a mixture of 125 ml. of dry benzene and 8 ml. of diethylamine, chilled, is added. The reaction mixture is allowed to come to room temperature and then stirred one hour. The mixture is washed with dilute HCl, water and brine, dried over calcium sulfate and solvent evaporated to yield crude N,N-diethyl 3,7,11-trimethyldodeca-2,4-dienamide, which can be purified by thin-layer chromatography using ethyl acetate/hexane or distillation.

The process of this example is repeated using each of ethylamine and isopropylamine in place of diethylamine to prepare N-ethyl 3,7,11-trimethyldodeca-2,4-dienamide and N-isopropyl 3,7,11-trimethyldodeca-2,4-dienamide.

What is claimed is:

1. A compound selected from those of the following formula:

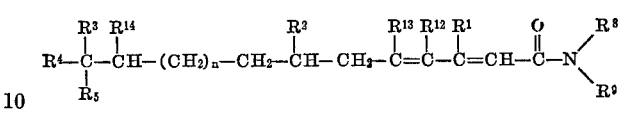

wherein,
n is zero or the positive integer one;
each of $R^1$, $R^2$ and $R^3$ is methyl or ethyl;
$R^4$ is lower alkyl;
each of $R^5$ and $R^{14}$ is hydrogen or methyl;
each of $R^{12}$ and $R^{13}$ is hydrogen; and
each of $R^8$ and $R^9$ is hydrogen, alkyl of one to three carbon atoms, or alkenyl of two to three carbon atoms.

2. A compound according to claim 1 wherein n is one.

3. A compound according to claim 2 wherein $R^4$ is methyl or ethyl.

4. A compound according to claim 3 wherein $R^1$, $R^2$ and $R^3$ are methyl; $R^5$ is hydrogen or methyl; and $R^{14}$ is hydrogen.

5. A compound according to claim 4 wherein $R^8$ is hydrogen, methyl, or ethyl, and $R^9$ is methyl or ethyl.

6. A compound according to claim 5 wherein $R^5$ is hydrogen.

7. A compound according to claim 6 wherein $R^8$ is hydrogen and $R^9$ is ethyl.

8. A compound according to claim 6 wherein $R^8$ is ethyl and $R^9$ is ethyl.

9. The compound, N-ethyl 3,7,11-trimethyldodeca-2,4-dienamide.

10. The compound N,N-diethyl 3,7,11-trimethyldodeca-2,4-dienamide.

11. The trans-2,trans-4 isomer of the compound according to claim 9.

12. The trans-2,trans-4 isomer of the compound according to claim 10.

13. The compound, N-isopropyl 3,7,11-trimethyldodeca-2,4-dienamide, according to claim 4.

14. The compound, N-allyl 3,7,11-trimethyldodeca-2,4-dienamide, according to claim 4.

15. The compound N,N-diethyl 3,7,11-trimethyltrideca-2,4-dienamide, according to claim 1.

16. The compound, N-ethyl 3,7,11-trimethyltrideca-2,4-dienamide, according to claim 1.

17. A compound according to claim 1 wherein $R^{14}$ is hydrogen, $R^4$ is methyl or ethyl; $R^5$ is hydrogen or methyl, each of $R^1$, $R^2$ and $R^3$ is methyl, and $R^8$ is hydrogen or methyl and $R^9$ is methyl.

18. The compound N,N-dimethyl 3,7,11-trimethyldodeca-2,4-dienamide, according to claim 17.

References Cited

UNITED STATES PATENTS

| 3,692,851 | 9/1972 | Henrick et al. | 260—654 R |
| 3,666,780 | 5/1972 | Calame et al. | 260—405 |
| 2,951,853 | 9/1960 | Matsui | 260—347.5 |

FOREIGN PATENTS 989,554   4/1965   Great Britain.

JAMES O. THOMAS, JR., Primary Examiner

D. G. RIVERS, Assistant Examiner

U.S. Cl. X.R.

260—408, 410.9 R, 413, 593 R, 601 R, 632 Y, 943; 424—320, Dig. 12